(12) United States Patent
Sutton et al.

(10) Patent No.: US 6,530,562 B1
(45) Date of Patent: Mar. 11, 2003

(54) AUTOMOTIVE BEAM SPRING

(75) Inventors: Craig V. Sutton, South Lyon, MI (US); John Piasentin, Farmington, MI (US); Paul Eugene Beshears, Jr., Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/026,867

(22) Filed: Dec. 19, 2001

(51) Int. Cl.$^7$ .................................. B60G 11/20
(52) U.S. Cl. ......................... 267/36.1; 267/47
(58) Field of Search ................ 267/36.1, 47, 52; 280/124.131

(56) References Cited

U.S. PATENT DOCUMENTS

| | | | | |
|---|---|---|---|---|
| 3,534,951 A | * | 10/1970 | Brownyer | 267/47 |
| 3,585,086 A | * | 6/1971 | Hrusovsky | 267/47 |
| 4,468,014 A | * | 8/1984 | Strong | 267/47 |
| 4,546,958 A | * | 10/1985 | Ohno et al. | 267/47 |
| 4,749,534 A | * | 6/1988 | Robertson | 264/136 |
| 4,972,920 A | * | 11/1990 | Zamitter et al. | 180/227 |
| 5,667,206 A | * | 9/1997 | Chang | 267/148 |
| 6,056,276 A | * | 5/2000 | Muzio | 267/36.1 |
| 6,361,032 B1 | * | 3/2002 | Lawson | 267/158 |

* cited by examiner

*Primary Examiner*—Christopher P. Schwartz
(74) *Attorney, Agent, or Firm*—John E. Kajander

(57) ABSTRACT

A beam spring capable of substantial elastic deformation in two planes to provide for independent wheel suspension and to commonize suspension mounting systems in a vehicle chassis.

3 Claims, 3 Drawing Sheets

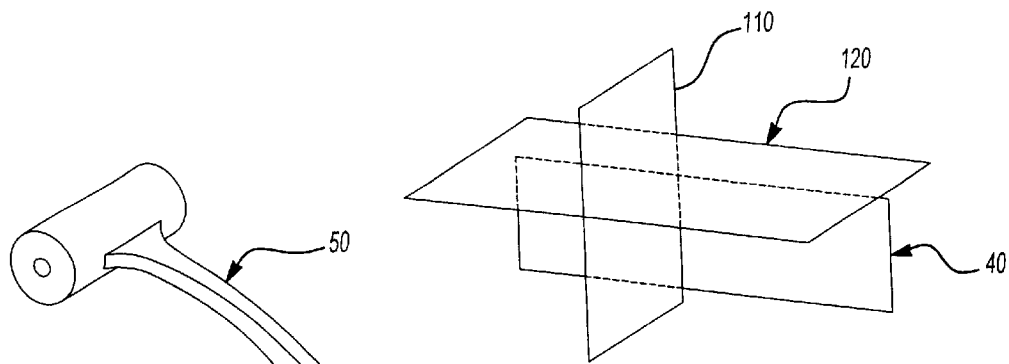
_Fig-3_
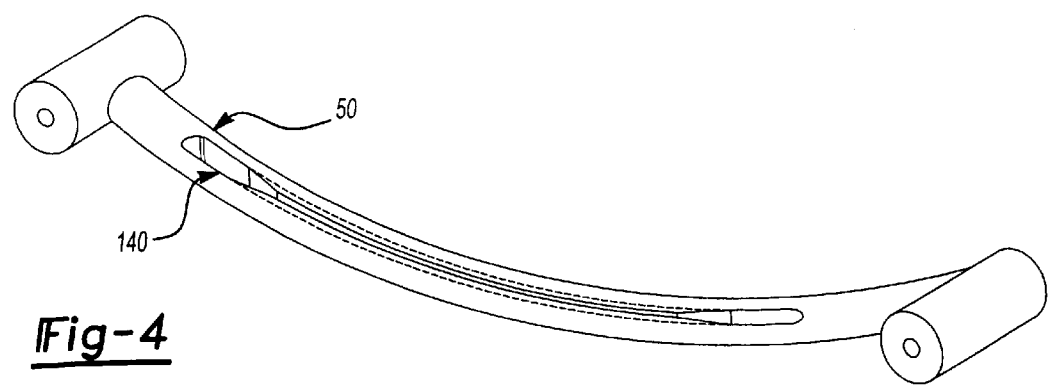
_Fig-4_
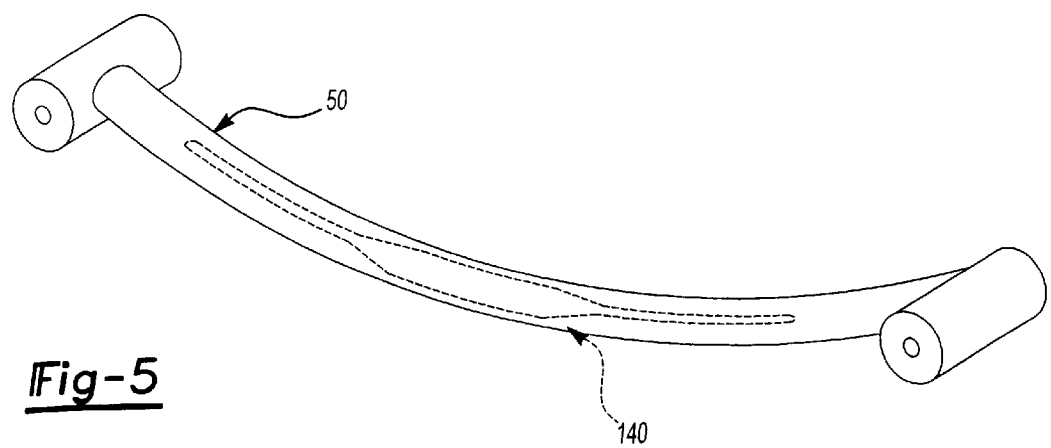
_Fig-5_

AUTOMOTIVE BEAM SPRING

CROSS REFERENCE TO RELATED APPLICATION

The present application is related to co-pending application Serial No. V201-0413, entitled "Automotive Independent Suspension System Using a Beam Spring", which is being concurrently filed herewith and which is incorporated herein by reference.

BACKGROUND OF THE INVENTION

1. Field of the Invention

The present invention relates generally to vehicle suspension springs, and more particularly to generally longitudinal, non-convolute automotive beam springs used to provide spring action in two planes.

2. Description of the Related Art

Previous automotive suspension systems using leaf springs relied on substantial elastic deformation in only one plane. Substantial inboard-outboard deformation of the spring was controlled by substantially higher spring rate stiffness in these planes created by wide leaf spring cross sections. Inboard-outboard deformation was typically not desired in these configurations since they were mainly paired with conventional beam axles which spanned the width of the vehicle and whose weight was completely unsprung by the suspension that is the entire weight of the axle was attached to the spring and not dependent on the chassis.

The conventional leaf spring designs are excellent for beam axle applications. Conventional Leaf springs are not suited to independent suspension systems however. These independent suspension systems are characterized by axles with a differential attached to the chassis and use articulated halfshafts to transmit torque to the unsprung wheel ends. The wheel ends in an independent suspension system travel in an arc controlled by a control arm. Since these independently suspended wheel ends travel in an arc rather than straight up and down (requiring two planes of deformation), leaf springs with only one plane of elastic deformation are not suitable. Currently, these independent suspension systems rely on coil springs and control arms to provide a suitable suspension. Coil springs mount differently on a chassis than do leaf springs and so the two systems are not interchangeable on a common chassis. In addition, control arms for coil spring suspensions are often very heavy and rely on multiple attachment points and expensive bushings to provide appropriate suspension characteristics. Coil springs and their control arms thus introduce added complexity and cost to an automobile over a conventional leaf spring design.

It would be desirable, therefore, to provide a spring which mounts to a vehicle like a leaf spring yet provides the multiple-plane elastic deformation of a coil spring.

BRIEF SUMMARY OF THE INVENTION

The present invention overcomes the disadvantages of the prior art approaches by providing a beam spring, which substantially elastically deforms in two planes.

It is an object and advantage of this invention to provide a beam spring with a longitudinal axis substantially greater in length than the horizontal and vertical axes and which is capable of substantial relative elastic deformation in both the vertical and horizontal planes.

These and other advantages, features and objects of the invention will become apparent from the drawings, detailed description and claims which follow.

BRIEF DESCRIPTION OF THE DRAWINGS

FIG. 3 is a perspective view of a beam spring with distinct cross sectional sizes and shapes at different longitudinal positions along the beam spring FIG. 4 is a perspective view of a beam spring with a supplemental stiffener.

FIG. 5 is a perspective view of a beam spring with a supplemental stiffener which has distinct cross-sectional sizes at different longitudinal positions along the beam spring.

DETAILED DESCRIPTION OF THE PREFERRED EMBODIMENT(S)

Figure 1:
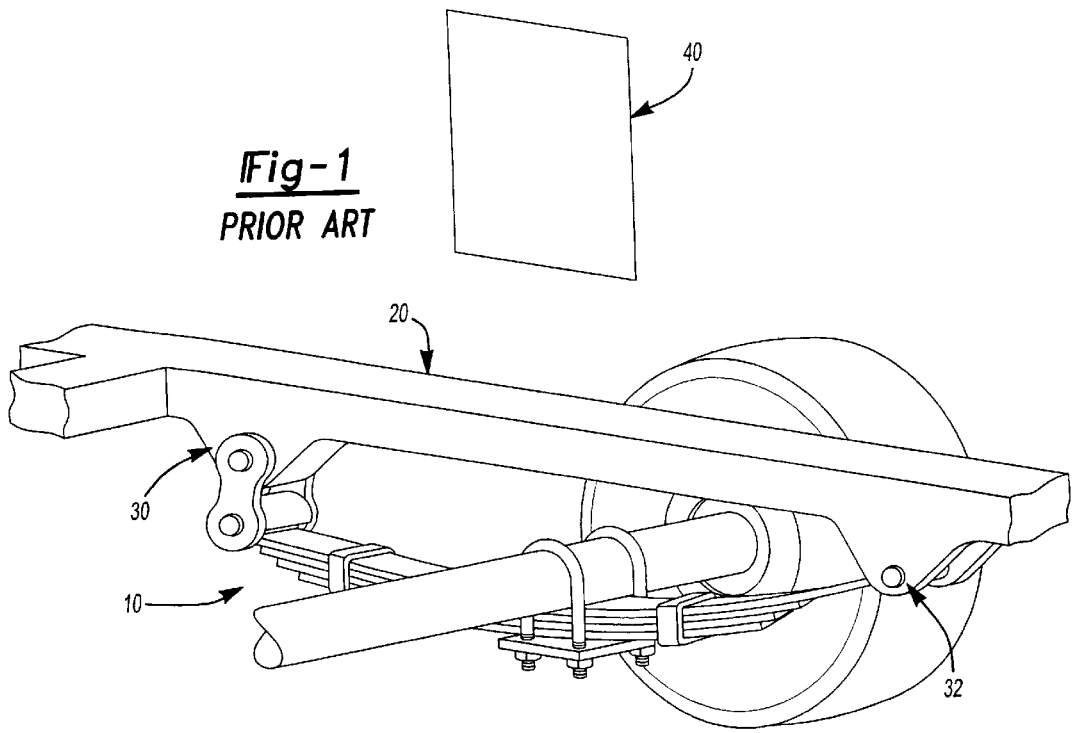
FIG. 1 is a perspective view of a typical leaf spring suspension combined with a beam axle.

Referring now to the drawings, FIG. 1 shows a conventional leaf spring suspension. A leaf spring 10, is mounted to a chassis 20 with a shackle 30 and a bushing 32. This mounting configuration, when combined with the cross sectional stiffness characteristics of the wide leaf spring 10, insures that this suspension elastically deforms in a substantial manner only in the vertical plane 40.

Figure 2:
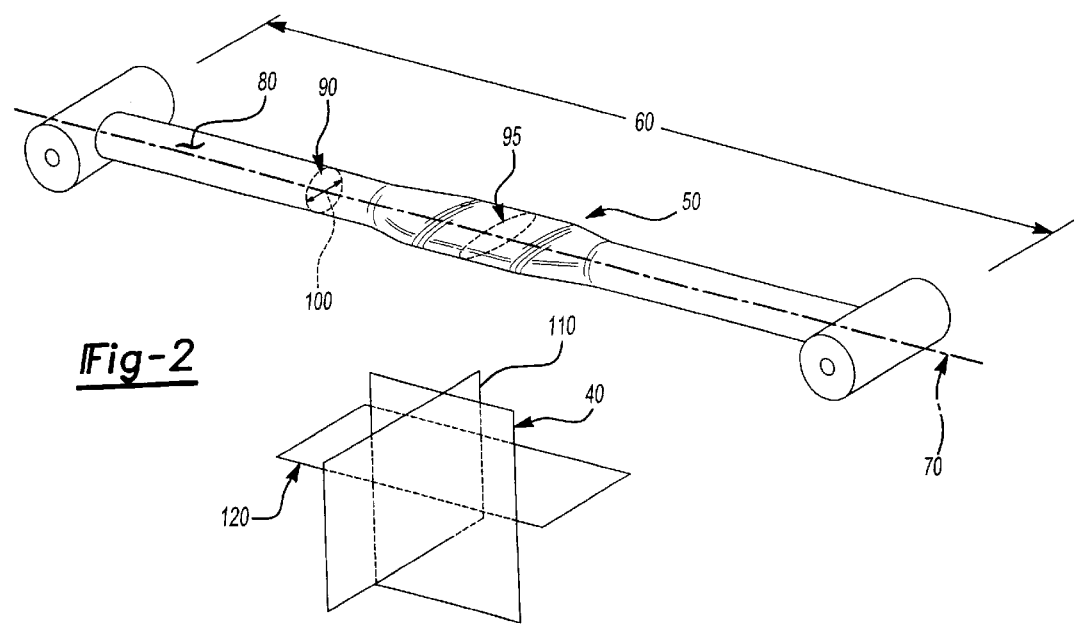
FIG. 2 is a perspective view of a beam spring with vertical and horizontal spring rates controlled by the cross section of the beam spring.

FIG. 2 shows an automotive beam spring 50 comprising a spring length 60, a longitudinal centerline 70, and an outer surface 80, said outer surface defined by at least one spring cross section 90, wherein said at least one spring cross section is perpendicular to said longitudinal centerline, said at least one spring cross section further comprising a maximum cross section width 100, wherein the ratio of said spring length to said maximum cross section width is at least 2. The spring rates in the vertical plane 40 and the horizontal plane 110 are both substantially greater than in relation to the spring rate in the longitudinal plane 120.

FIG. 3 shows an automotive beam spring 50 with multiple cross sections, i.e., distinctly varying size or shape of the transverse cross section at different longitudinal positions along beam spring 50. These cross sections impart a unique spring rate in the horizontal and vertical planes. In this beam spring, the variation of the spring rates in the vertical plane 40 and the horizontal plane 110 may be due strictly to the variances in the cross section or may be due to the variances of the cross section and variances in material properties throughout a homogenous or semi-homogenous material. Variances in material properties in a homogenous material may be the result of heat or chemical treating of various areas of the material. The spring rates in the vertical plane 40 and the horizontal plane 110 are both substantially greater than the spring rate in the longitudinal plane 120. The invention includes the use of varied, controlled rates of stiffness along various axes throughout the beam spring in order to tune the stiffness response of the beam spring in the several planes in which it must elastically deform. There are many ways of varying the stiffness rates of springs along various axes throughout the spring. As in FIG. 3 the cross sectional widths of the beam spring in various axes transverse to its longitudinal centerline are varied to provide a varying stiffness response of the beam spring in the multiple planes in which it must elastically deform. Specific embodiments include using circular cross sections at the beam spring ends compared to a middle cross section that is rectangular—substantially wider in the horizontal plane than in the vertical plane. Another embodiment employs rectangular cross sections of various sizes as in FIG. 3. This configuration offers relative high stiffness horizontally at the midsection but allows horizontal elastic deformation to be concentrated at the ends, where it is easier to control the deformation movement in the horizontal plane, without undue vibration or 'wag'. Alternately, one may want to employ wide, flat cross sections at the ends to promote durability, while using a smaller, round midsection for elastic deformation in the horizontal plane. Other cross sections may be used in multiple combinations to tune the response of the suspension—for instance progressively increasing spring rates may be developed by increasing the stiffness of the beam spring along its length by varying the cross section.

FIG. 4 shows a beam spring 50 with a supplemental stiffener 140. Because the supplemental stiffener 140 is made up of either softer or harder material than the rest of the beam spring, it adjusts the stiffness of the beam spring 50 in a certain area along the longitudinal axis. The beam spring 50 may be made of various materials and/or combinations of materials including composites, metal, in-cast metals, and plastic-metal hybrid materials. By incorporating supplemental stiffeners 140 made of materials of various stiffness rates at various places in the cross section and along the longitudinal centerline, one can vary the stiffness behavior of the spring as needed. For instance, the inclusion of a softer composite supplemental stiffener material along a length of the longitudinal axis of a beam spring with a constant cross section will vary the stiffness along the beam spring, creating a softer area along the length of the longitudinal axis where the softer material is located. Note that harder material may be used as a supplemental stiffener in the beam spring either separately or together with softer material, both being referred to as supplemental stiffeners in the invention. Similarly, a metal or metals of varying stiffness rates may be incorporated together to form a beam spring as well. In-cast technology, over-forging and insert molding one metal into a cavity within another are several examples of this type of beam spring. Over-molding plastic onto steel frames, or hybrid metal plastic construction, can also be used to develop a beam spring with a supplemental stiffener.

FIG. 5 shows a beam spring 50 with a supplemental stiffener 140 having multiple cross sections. In this instance, the spring rate is varied not by changes in the outer spring cross section, but by changing the cross section and thus the spring rate of the supplemental stiffener.

Figure 6:
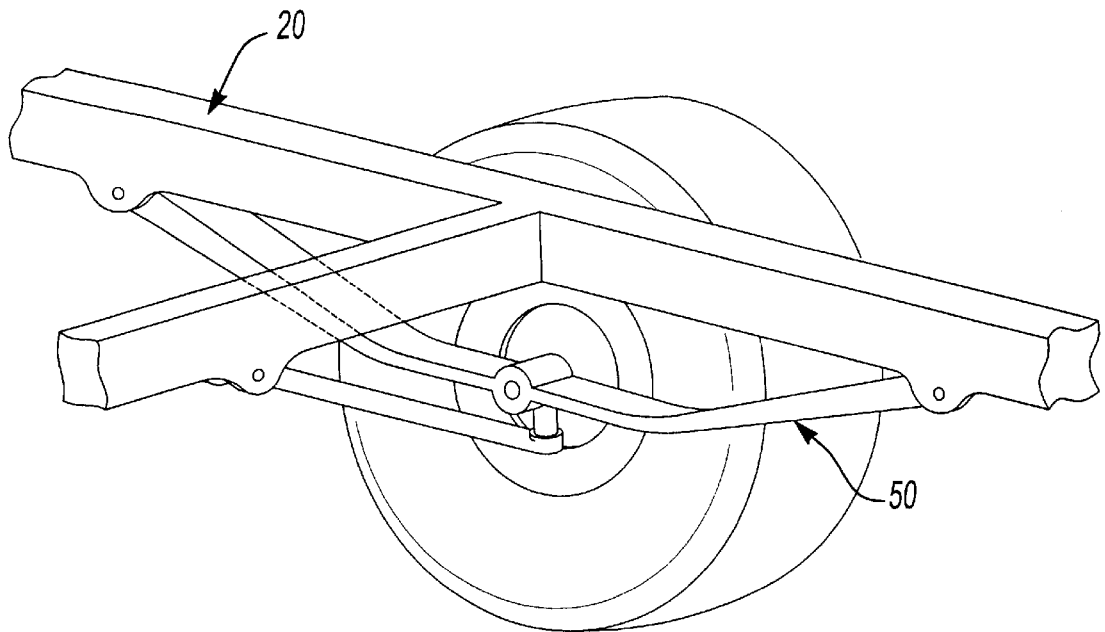
FIG. 6 is a perspective view of a beam spring attached to a chassis at two points.

FIG. 6 shows a beam spring 50 attached to a chassis 20 at two points. This is a similar attachment method as is used with conventional leaf springs.

Figure 7:
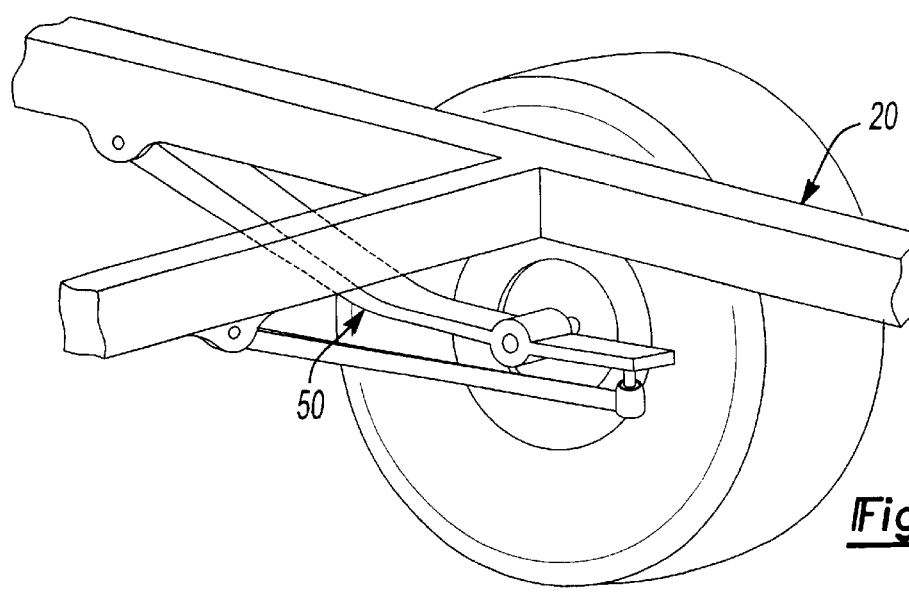
FIG. 7 is a perspective view of a beam spring attached to a chassis at one point.

FIG. 7 shows a beam spring 50 attached to a chassis 20 at a single point. This mounting method allows for more flexible packaging considerations and allows for a cheaper chassis 20 construction, without a second suspension attachment point. The beam spring may be attached in a variety of ways. One way to attach a single point beam spring is to form the first end of the beam spring to cooperatively nest over an existing leaf spring mount on the chassis. A hole provided in the beam spring, which matches that of the existing chassis mount, can be pinned to fixedly attach the beam spring to the chassis i.e., a single chassis could be used for both dependent and independent. Features on the beam spring can be incorporated to provide leverage against the chassis when mounted with a pin in order to prevent rotation of the beam spring about the fixing pin. In this way, a beam spring attached by a single point can elastically support a changing suspension load.

The beam spring may also be attached to the chassis at two points. One way to attach a dual point beam spring is to form each end of the beam spring to cooperatively nest over a corresponding, existing leaf spring mount on the chassis, similar to the fashion described for a single point beam spring above.

Another way of attaching a beam spring to the chassis includes a sleeve attached to the chassis, designed to slip over an end of the beam spring. The beam spring may then be pinned, glued or crimped to fixedly attach it to the frame and prevent rotation of the end of the beam spring in relation to the chassis.

The attachment mechanisms and configuration of control arm or arms and the shock absorber to the beam spring suspension are dependent on the particular configuration and materials used.

Various other modifications to the present invention may occur to those skilled in the art. For example, the inclusion of halfshafts and a sprung differential and/or transmission to the beam suspension system. Additionally, control arms with more than two attachment points may be employed. Other modifications not explicitly mentioned herein are also possible and within the scope of the present invention. It is the following claims, including all equivalents, which define the scope of the present invention.

What is claimed is:

1. An automotive suspension beam spring comprising:
   a generally longitudinal spring body having a spring length and a longitudinal centerline, wherein said spring body is made from a spring material having a vertical spring rate constant in the vertical plane and a horizontal spring rate constant in the horizontal plane, further wherein said spring body is capable of substantial relative elastic deformation in the horizontal and the vertical planes respectively;
   an outer surface, said outer surface defined by at least one spring cross section taken perpendicularly with respect to said longitudinal centerline and having a maximum spring cross section width, wherein the ratio of said spring length to said maximum cross section width is at least 2;
   at least one supplemental stiffener, said supplemental stiffener further comprised of at least one other material with substantially different stiffness characteristics than said spring material, wherein at least one cross section of said supplemental stiffener is contained within said at least one cross section of said beam spring;
   further wherein said at least one supplemental stiffener further comprises a first cross section within a first segment along said longitudinal centerline of said spring body and at least one other cross section within another segment along said longitudinal centerline of said spring body, wherein said first cross section defines a first segment and said at least one other cross section defines a second segment, further wherein said first segment has a spring rate constant substantially higher than said at least one other cross section.

2. An automotive suspension beam spring comprising:
   a generally longitudinal spring body having a spring length and a longitudinal centerline, wherein said spring body is made from a spring material having a vertical spring rate constant in the vertical plane and a horizontal spring rate constant in the horizontal plane, further wherein said spring body is capable of substantial relative elastic deformation in the horizontal and the vertical planes respectively;

an outer surface, said outer surface defined by at least one spring cross section taken perpendicularly with respect to said longitudinal centerline and having a maximum spring cross section width, wherein the ratio of said spring length to said maximum cross section width is at least 2;

further comprising at least one supplemental stiffener, said supplemental stiffener further comprised of at least one other material with substantially different stiffness characteristics than said spring material, further wherein at least one cross section of said supplemental stiffener is contained within said at least one cross section of said beam spring; further wherein said spring body is a metal with one crystal structure and at least one of said at least one other material is a metal with a different crystal structure.

3. An automotive suspension beam spring comprising:

a generally longitudinal spring body having a spring length and a longitudinal centerline, wherein said spring body is made from a spring material having a vertical spring rate constant in the vertical plane and a horizontal spring rate constant in the horizontal plane, further wherein said spring body is capable of substantial relative elastic deformation in the horizontal and the vertical planes respectively;

an outer surface, said outer surface defined by at least one spring cross section taken perpendicularly with respect to said longitudinal centerline and having a maximum spring cross section width, wherein the ratio of said spring length to said maximum cross section width is at least 2;

further comprising at least one supplemental stiffener, said supplemental stiffener further comprised of at least one other material with substantially different stiffness characteristics than said spring material, further wherein at least one cross section of said supplemental stiffener is contained within said at least one cross section of said beam spring; further comprising at least one inner chamber formed by an inner spring surface, wherein said inner surface is defined by an inner surface cross section, further wherein all of said inner surface cross section is contained completely within said at least one cross section of said spring body.

* * * * *